May 5, 1936.  B. F. BIRD  2,039,769
APPARATUS FOR HYDRATING
Filed Jan. 10, 1934  2 Sheets-Sheet 1
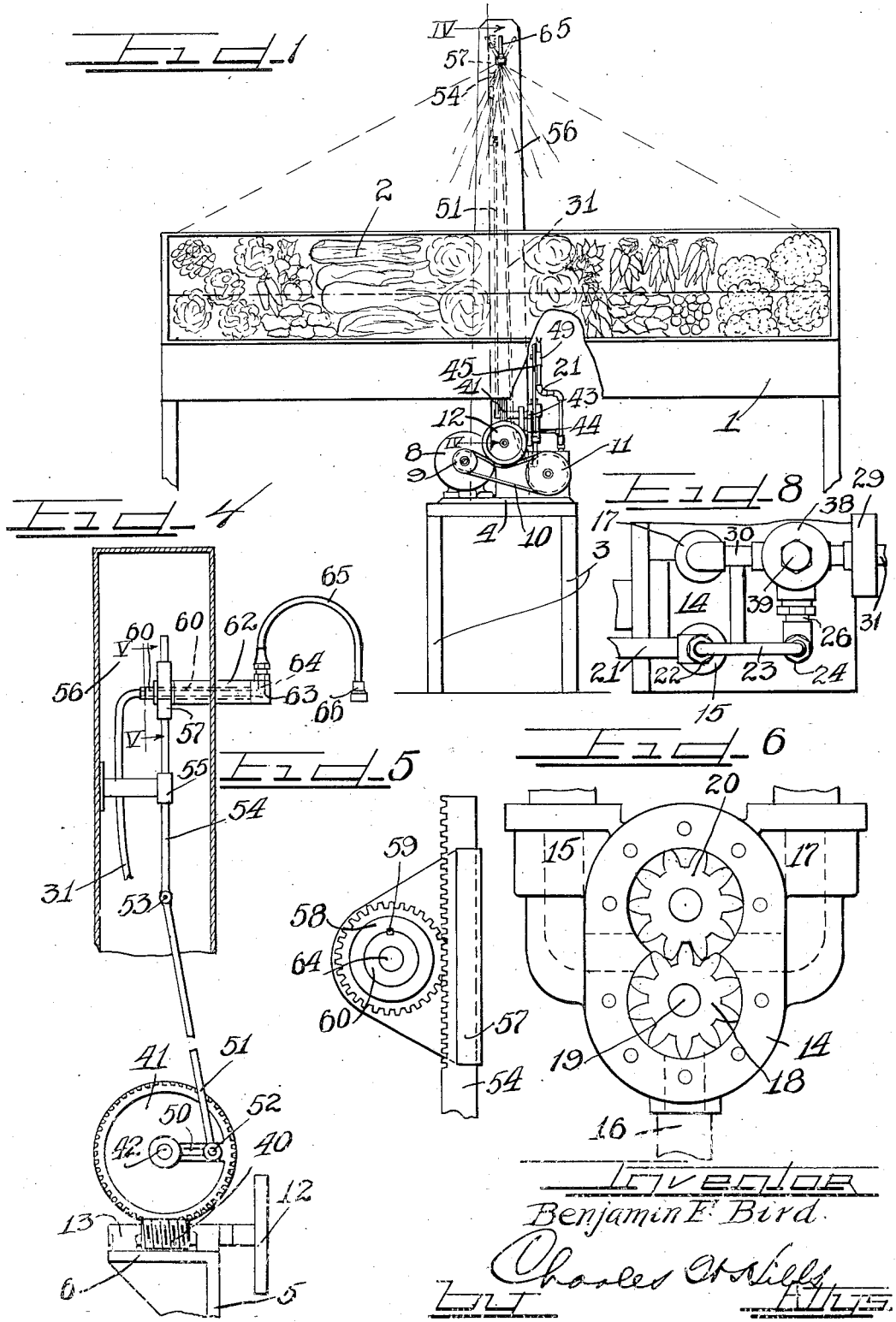

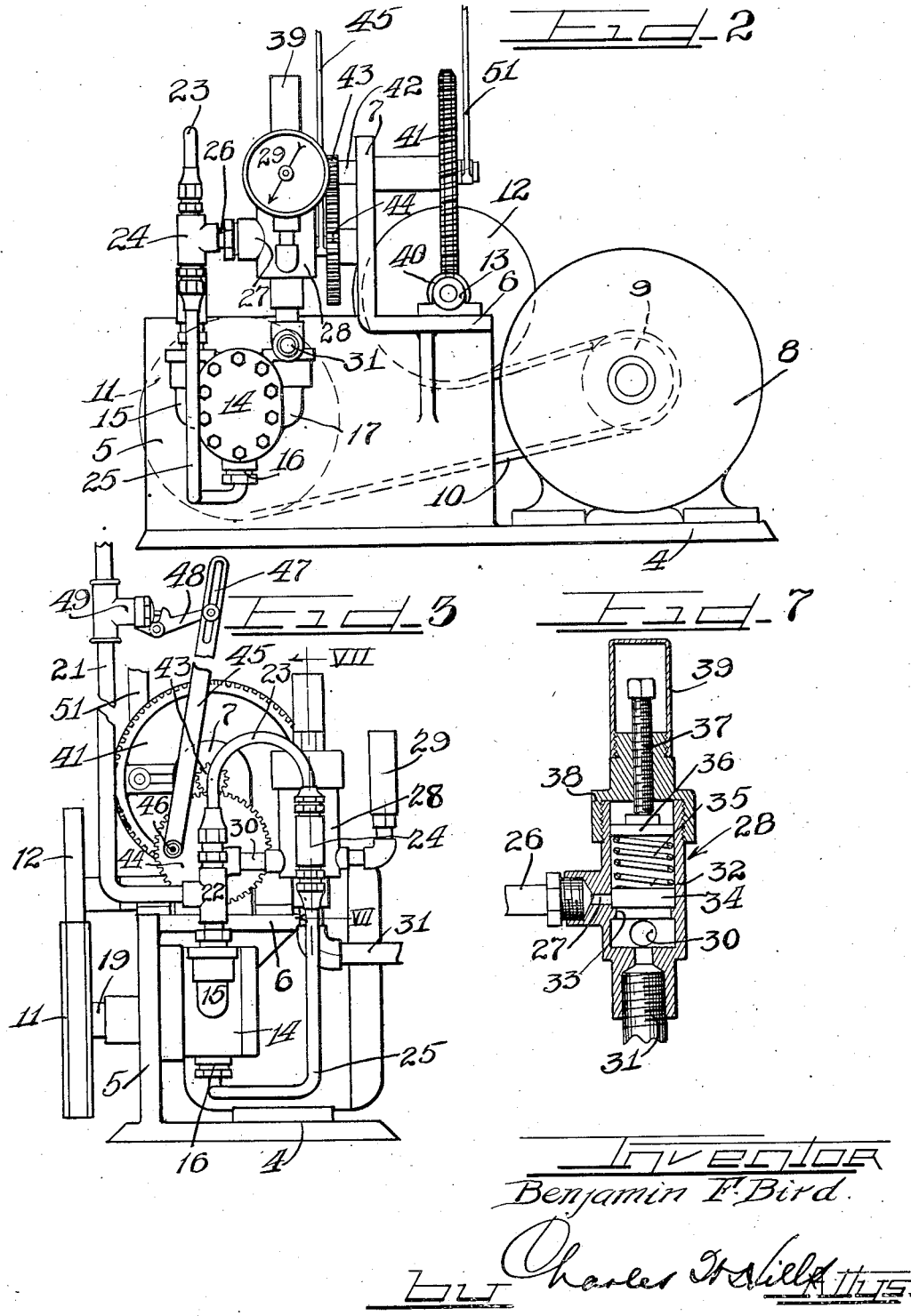

Patented May 5, 1936

2,039,769

UNITED STATES PATENT OFFICE 2,039,769

APPARATUS FOR HYDRATING

Benjamin F. Bird, Kenilworth, Ill.

Application January 10, 1934, Serial No. 706,002

5 Claims. (Cl. 299—25)

This invention relates to apparatus for hydrating, the invention being highly desirable for use in the preservation through hydration of vegetables and other plant life, although the invention will have other and various uses and purposes as will be apparent to one skilled in the art.

This invention is an improvement over the invention set forth and claimed in my copending application entitled "Vegetable hydrating apparatus", Serial No. 676,498, filed June 19, 1933, and some of the major improvements in this invention over that of my copending application are the elimination of the use of compressed air together with the air compressor, intermittent actuation by valve control of the water supply, the incorporation of a pressure by-pass valve, the reduction in power consumption of the driving means with the aid of the pressure by-pass valve, the increasing of pressure in the supply line leading to the spray, and the use of a spray providing a vapor and mist without the aid of compressed air. Other advantages and improvements over the invention of my copending application will be apparent from the disclosures hereinafter.

As pointed out more fully in my copending application, devices of the character set forth herein are practically necessary for the preservation of vegetables in their natural state, especially by vendors of vegetables, certain fruits and similar edibles, when it is essential to keep such articles on display for the benefit of the ultimate purchaser. For best results, in the prevention of rot and over-evaporation of the vegetables, it has been found that a light spray or fine vaporous mist of water applied periodically to the vegetables keeps them in a very fine degree of freshness and even adds, in many instances, to the normal moisture content of the plant. Consequently, the extremely high loss commonly suffered by dealers owing to the disintegration of the vegetables is brought down to a very satisfactory minimum with the use of the present invention.

Heretofore, devices have been developed for this purpose, but these formerly known devices were objectionable in various ways, namely—that they did not preserve the vegetables or other plants in a satisfactory manner, that they made too much noise in operation, and were not as efficient as is desired. In other instances, the installation cost was almost prohibitive to the vegetable dealer. Some of the devices operated upon the complete stop and start principle, and as is well known, if the devices are electrically driven, substantially the same amount of power is consumed for intermittent and reasonably rapid starting and stopping as for steady operation. Intermittent starting and stopping result in objectionable noises, and also, in many cases, cause a fluctuation in current supply to other electrical branches in the place of business.

The present invention is designed to overcome the above noted as well as other defects and objections, in the provision of a hydrating device, operating intermittently, and utilizing driving means running continuously.

It is also an object of this invention to provide hydrating apparatus, wherein a water supply to the spray or nozzle of the apparatus is intermittently cut off by valve control mechanism operating directly upon the water supply.

Also an object of this invention is the provision of hydrating apparatus utilizing a spray or nozzle designed to create a fine, vaporous mist of water without the aid of compressed air, and valve control means for intermittently cutting off the water supply to the spray or nozzle.

It is a further object of this invention to provide hydrating apparatus wherein pressure developing means are used between the water supply and the spray or nozzle of the apparatus to build up the pressure of the water prior to its expulsion from the nozzle, and valve control means are utilized to intermittently cut off the water supply.

Still another object of this invention is the provision of hydrating apparatus including motor driven pump mechanism to build up the pressure of the water prior to its expulsion from the nozzle, the pump mechanism discharging water initially into a pressure by-pass valve mechanism which, after a predetermined pressure is reached, by-passes some of the water under the predetermined pressure directly into the intake side of the pumping mechanism, aiding the operation of the last said mechanism and adding to the economical operation of the motor or other driving means.

Another object of this invention is the provision of hydrating apparatus including an oscillating spray, pressure developing means in the water supply prior to its expulsion from the spray, and mechanism for intermittently cutting off the water supply, there being unitary driving means for actuating all of the parts.

While some of the more salient features, characteristics and advantages of the present invention have been above pointed out, others will become apparent from the following disclosure.

The invention includes these and other features of construction, combinations of parts, and process steps, as hereinafter described, and shown in a preferred form in the drawings, as more particularly indicated by the claims.

On the drawings:

Figure 1 is a view in elevation, with parts broken away, illustrating apparatus involved and the use of the present invention.

Figure 2 is an enlarged fragmentary view with the main operating mechanism as shown in Figure 1, but seen from the opposite side.

Figure 3 is a fragmentary side elevational view of the structure shown in Figure 2, taken from the left-hand side thereof.

Figure 4 is a fragmentary sectional view with parts broken away taken substantially as indicated by the line IV—IV of Figure 1.

Figure 5 is an enlarged fragmentary sectional view of a portion of the apparatus taken substantially as indicated by the line V—V of Figure 4.

Figure 6 is an enlarged fragmentary front elevational view of the pump mechanism shown with the cover thereof removed.

Figure 7 is an enlarged fragmentary vertical sectional view through the pressure by-pass valve, taken substantially as indicated by the line VII—VII of Figure 3.

Figure 8 is a diagrammatic plan view of a portion of the piping mechanism associated with the pump, indicating the lay-out of the pipes.

As shown on the drawings:

The present invention is illustrated with a hydrating apparatus functioning in connection with a display stand 1 containing a plurality of various vegetables 2, although it will be understood that the invention may be used with other and various articles to be hydrated and in other and various positions.

Preferably, beneath the stand 1, any suitable type of foundation 3 is provided and upon which the base 4 of the operating mechanism rests. All of the operating mechanism is preferably assembled in unitary style upon the single base 4 which carries integral therewith an upright frame portion 5 of suitable shape. The frame 5 includes a horizontally extending shelf 6 and a second upright portion 7 is integral with the shelf 6 and functions as a bearing for certain shafts to be later described herein.

Although an electric motor 8, mounted upon the base 4 and obtaining energy from any suitable source of power not shown in the drawings, is illustrated as the driving means for the present invention, it will readily be understood that any other suitable form of driving means might equally as well be employed. The shaft of the motor is provided with a driving pulley 9 engaged by a suitable belt 10 which passes over a pulley 11 journalled in the upright 5 of the frame. The belt not only drives the pulley 11 but also drives a rider pulley 12 suitably mounted in a journal 13 (Figure 2) on the shelf 6 of the frame. Obviously, the rider pulley 12 turns in a reverse direction to that of the pulleys 9 and 11.

Mounted in any suitable manner on the opposite side of the vertical wall 5 of the frame (Figures 2 and 3) is a pump 14. In this instance, the pump is shown as a gear pump, although it might be equally as feasible to use some other type. The pump 14 as best seen in Figure 6, preferably comprises a casing having an inlet 15 formed on one side thereof, another inlet 16 formed in the bottom thereof, and an outlet 17 disposed oppositely to the inlet 15. Within the pump body the lower gear 18 is mounted upon and driven by a shaft 19 which is also the shaft of the pulley 11 (Figure 3). An upper gear 20 is also included within the pump casing on a suitable shaft and is arranged to be driven by the lower gear, but obviously in the opposite direction. The inlet 15 and the outlet 17 preferably communicate evenly or in the same plane with the meshed teeth of the gears 18 and 20, whereby fluid entering the inlet 15 cannot pass straight through to the outlet 17 but must be carried around through substantially a revolution of the gears within the spaces between the gear teeth in a manner well known in connection with the use of gear pumps.

A water supply line 21 connected to any suitable source of water supply not shown in the drawings, leads by way of a T 22 and the customary fitting to the inlet 15 of the pump 14 (Figure 3). The other leg of the T 22 is connected through a by-pass 23 to the upper leg of a T 24 which functions as a by-pass casing and has the lower vertical leg thereof connected through a pipe line 25 to the intake 16 at the bottom of the pump casing. The horizontal leg of the T 24 is connected by means of a suitable nipple 26 (Figure 2) and the customary connections to a port 27 opening from the side of a pressure by-pass valve mechanism generally indicated by numeral 28. This pressure valve mechanism is provided with a suitable pressure gauge 29 for a well known purpose. The outlet 17 is also connected through a suitable pipe 30 to the pressure valve mechanism preferably at a point below the pipe 26 (Figures 3 and 7). Leading from a port in the bottom of the pressure valve casing is a pipe line 31, the upper portion of which is flexible, and which communicates, as indicated in Figs. 1 and 4 with the spraying device which will be later described.

The pressure by-pass valve mechanism itself as seen in Figure 7 comprises a body portion 32 provided with an inner annular shoulder 33 above the aforesaid inlet pipe 30 from the pump discharge 17. Immediately above and normally resting upon the shoulder 33 is a piston 34, which, when in its normal position, effectively blocks the aforesaid outlet 27 leading through the line 26 to the by-pass T 24. The piston 34 is held in normal position by means of a spring 35 bearing thereagainst, and also bearing at the opposite end against the head plate 36. The force exerted by this spring may be varied in accordance with exigencies of the circumstances by means of a screw 37 threadedly engaged in a cap 38 upon the body portion 32. A protecting closure 39 is threadedly engaged with the cap 38 over the head of the adjusting screw 37.

From the foregoing description of the pressure valve mechanism, it is apparent that when water is introduced into the casing 32 from the pump discharge through the inlet 30, the water will pass into the pipe line 31 through the relatively restricted opening thereto and eventually reach the nozzle of the spraying apparatus. However, when the pressure within the casing 32 builds up to a predetermined value, the piston 34 will be elevated against the action of the spring 35 and open up the by-pass port 27 whereupon a proportionate quantity of the water will be by-passed through the line 26 into the by-pass T 24 and thence through both lines 23 and 25 into the pump through the intake ports 15 and 16 respectively.

An important feature of the present invention becomes apparent at this point, namely—that the water entering the pump through the lines 23 and 25 is obviously under pressure previously developed by the pump.

Consequently, this water entering through the intake ports 15 and 16 will exert pressure upon the teeth of the gears 18 and 20 and enhance the rotation of these gears thereby lessening the work and the power consumption of the driving motor 8. It has been found by actual test that the power consumption of the motor is materially lessened with this form of bypassing, than with a form where the bypassed water is not led back into the pump. Obviously, if some other form of driving means rather than the electric motor 8 were utilized, the operation of such driving means would be rendered more economical with the above described bypass arrangement.

It is desirable, when hydrating articles of the character of fresh vegetables, to provide the mist of water only at predetermined intervals, since too much water is almost as bad as not enough. Means are therefore provided in the present invention for intermittently cutting off the water supply. The means employed herein, however, act directly upon the water supply and do not require a cessation of operation of the driving means as is the case in my copending application. The water control means are driven or actuated through suitable interconnecting mechanism from the motor 8.

The aforesaid rider pulley wheel 12 with its shaft journaled as at 13 on the shelf 6 carries upon its shaft a worm wheel 40 (Figures 2 and 4). This worm wheel meshes with a suitable gear 41 carried on a shaft 42 journaled in the upright 7 of the frame. On the opposite side of the upright the shaft 42 also supports a pinion 43 which in turn meshes with a spur gear 44 also carried by suitable shafts journaled in the same upright 7 at a point lower down (Figures 2 and 3). At an eccentric or offset point on the gear 44, a pitman 45 is connected at one of its ends as indicated at 46, and the other end of this pitman is provided with a lost motion slot 47 within which the outer end of a valve actuating arm 48 is pivotally and slidably connected. This valve arm 48 controls a valve 49 which may be of any suitable standard character and is disposed in the water supply line 21. It will therefore be seen that the worm wheel 40, the gear 41, the pinion 43 and the spur gear 44 effect a reduction gearing driven by means of the motor 8, whereby the pitman 45 will be actuated at a much slower speed than is the armature of the motor. As the construction is seen in Figure 3, the valve 49 is closed and the water supply cut off, but as the gear 46 turns and the pitman rises, the valve arm 48 will be pivoted upwardly and inwardly opening the valve for a suitable period of time, after which through the continuous movement of the gear 46 the pitman will close the valve again at a more advanced point in its cycle.

From the foregoing, it will be seen that while the motor may run continuously, and therefore much more quietly and with no interference with other electrical apparatus in the same building, and while the pump also runs continuously, the water supply is intermittently cut off, and by proper adjustment of the valve 49 and an obvious arrangement of the pitman 45 the intervals of time relative to the water flow may easily be predetermined.

For the adequate hydrating of vegetables or whatever else it may be desired to hydrate, it is found expedient to employ an oscillating spray. To this end, the gear 41 driven from the worm 40 is provided with a radial slot 50 (Figure 4) and the lower end of a pitman 51 is pivotally and slidably connected in the slot 50 as indicated at 52. The upper end of the pitman is pivotally connected at 53 to a vertically reciprocatory rack 54 slidable in a suitable bearing 55 secured in any desired manner to a vertically extending housing 56. The rack is in place by a guide element 57 also suitably mounted within the housing 56. The rack meshes with a hubbed spur gear 58 keyed as at 59 (Figure 5) to a rock shaft 60 in the form of a hollow pipe to the inner end of which the flexible water feeding line 31 is connected as at 61 by any suitable fitting. The rock shaft 60 is contained within a suitable bearing housing 62 mounted in any desired manner on the housing 56, and beyond the housing 62 the rock shaft is provided with a head 63 of substantially the same size as the housing. The head 63 may be integral with the rock shaft or securely affixed thereto and is rotatable therewith. As seen clearly in Figure 4 the head 63 is provided with a right angular opening therein 64 in alignment with the passage through the rock shaft. Secured to this head also in alignment with the other leg of the opening 64 is a spray pipe 65 terminating in a nozzle 66 which is of a type designed to expel a fine spray or vaporous mist of water or other fluid passing therethrough, a nozzle of the type used in atomizing oil burners being highly satisfactory. Of course, the spray pipe 65 together with the nozzle oscillates back and forth with the rock shaft, as indicated by the dotted lines in Figure 1, so all of the vegetables contained in the tray 1 will be equally hydrated.

It is obvious from the foregoing description, that as the gear wheel 41 rotates, the rack bar 54 is caused to reciprocate by means of the pitman 51 and oscillates or rocks the shaft 60 together with the spray backwards and forwards. The pipe 65 is preferably flexible and can be bent to adapt the spray for various widths of stands 1.

The operation of the present invention is extremely simple and economical. Water enters through the supply line 21 going directly into the pump through the intake 15. In the pump, pressure is developed and water under higher pressure is discharged through the exit 17 into the pressure bypass valve through the intake 30. Water flows out of this valve through the restricted outlet into the line 31 and from there is ejected through the nozzle 66 over the substance to be hydrated. At the same time, the nozzle is caused to oscillate by means of the pitman 51 connected to the gear 41 and the rack and gear connection 54 and 58 respectively. Also at the same time the water supply in the line 21 is intermittently cut off at predetermined time intervals by means of the gear 44, pitman 45 and valve 49.

If, while the water supply is on, a greater than a predetermined pressure is developed within the pressure bypass valve mechanism, this mechanism responds to bypass water under pressure back into the pump through the intakes 15 and 16. As explained hereinabove, this water entering the pump under previously developed pressure augments the pump in its action and lessens the duty imposed upon the driving mechanism, resulting in more economical operation of the driving mechanism.

From the foregoing, it will be apparent that I have provided a simple unitary construction for hydrating purposes, wherein practically all of the mechanism is mounted on a unitary assembly, and all of the operating parts may be driven from a single driving mechanism. Most of the parts preferably run continuously and the intermittent discharge of water mist is caused by direct intermittently operable control in the water supply. The entire hydrating apparatus is extremely durable, readily and easily installed, and economical to manufacture and operate.

The method of hydrating embodied in the present invention is deemed to be sufficiently clear from the foregoing description of the apparatus and its operation, even though this apparatus is not the only apparatus capable of performing the method, to render further description of the method herein unnecessary.

I claim as my invention:

1. In a hydrating apparatus, a display stand containing vegetables or the like an oscillatable spray means for delivering a uniform spray over the vegetables from one end of the stand to the other, water feeding means leading to said spray means, pressure means for building up pressure in said feeding means, power means operatively associated with said pressure means and said oscillatable spray means, valve means associated with said feeding means, and control means operatively connected with said power means and responsive thereto for intermittently actuating said valve means to periodically cut off the supply of water to the spray means so as to prevent too much water from being sprayed on the vegetables.

2. In a hydrating apparatus, a display stand containing vegetables or the like, an oscillatable spray means for delivering a uniform spray over the vegetables from one end of the stand to the other, water feeding means leading to said spray means, pressure means for building up pressure in said feeding means, power means operatively associated with said pressure means and said oscillatable spray means, valve means associated with said feeding means, and control means operatively connected with said power means and responsive thereto for intermittently actuating said valve means to periodically cut off the supply of water to the spray means so as to prevent too much water from being sprayed on the vegetables, said spray means including an oscillatory spray nozzle supported substantially at the middle of the stand and high enough above the stand to spray the vegetables from one end of the stand to the other.

3. In a hydrating apparatus, a display stand containing vegetables or the like, an oscillatable spray means for delivering a uniform spray over the vegetables from one end of the stand to the other, water feeding means leading to said spray, pressure means for building up pressure in said feeding means, power means operatively associated with said pressure means and said oscillatable spray means, valve means associated with said feeding means, control means operatively connected with said power means and responsive thereto for intermittently actuating said valve means to periodically cut off the supply of water to the spray means so as to prevent too much water from being sprayed on the vegetables, said pressure means being in advance of said spray means and by-pass means between said pressure building means and said feeding means designed to feed said feeding means and by pass water directly into said pressure developing means when a predetermined pressure is reached whereby a relatively constant fluid pressure can be maintained in said spray means.

4. In a hydrating apparatus, a display stand for vegetables and the like, oscillatory spray means arranged to spray the contents of said stand progressively back and forth from one end of the stand to the other, water supply means leading to said spray means, mechanism for increasing the pressure in said water supply means, driving means for said mechanism and spray means, and control mechanism operated by said driving means arranged to periodically cut off the water supply to said spray means while the driving means continues to operate.

5. In a hydrating apparatus, a display stand for vegetables and the like, oscillatable spray means arranged to spray the contents of said stand, water supply means leading to said spray means, mechanism for increasing the pressure in said water supply means, mechanism for oscillating said spray means, driving means to operate both said mechanisms, and control mechanism also driven by said driving means and arranged to periodically cut off the water supply to the spray means at predetermined intervals of time while other moving parts continue their operation.

BENJAMIN F. BIRD.